Oct. 12, 1971  S. W. GLICKSTON  3,611,674
APPARATUS AND METHOD FOR FORMING AND PACKAGING COTTON SWABS
Filed Jan. 21, 1969  7 Sheets-Sheet 1
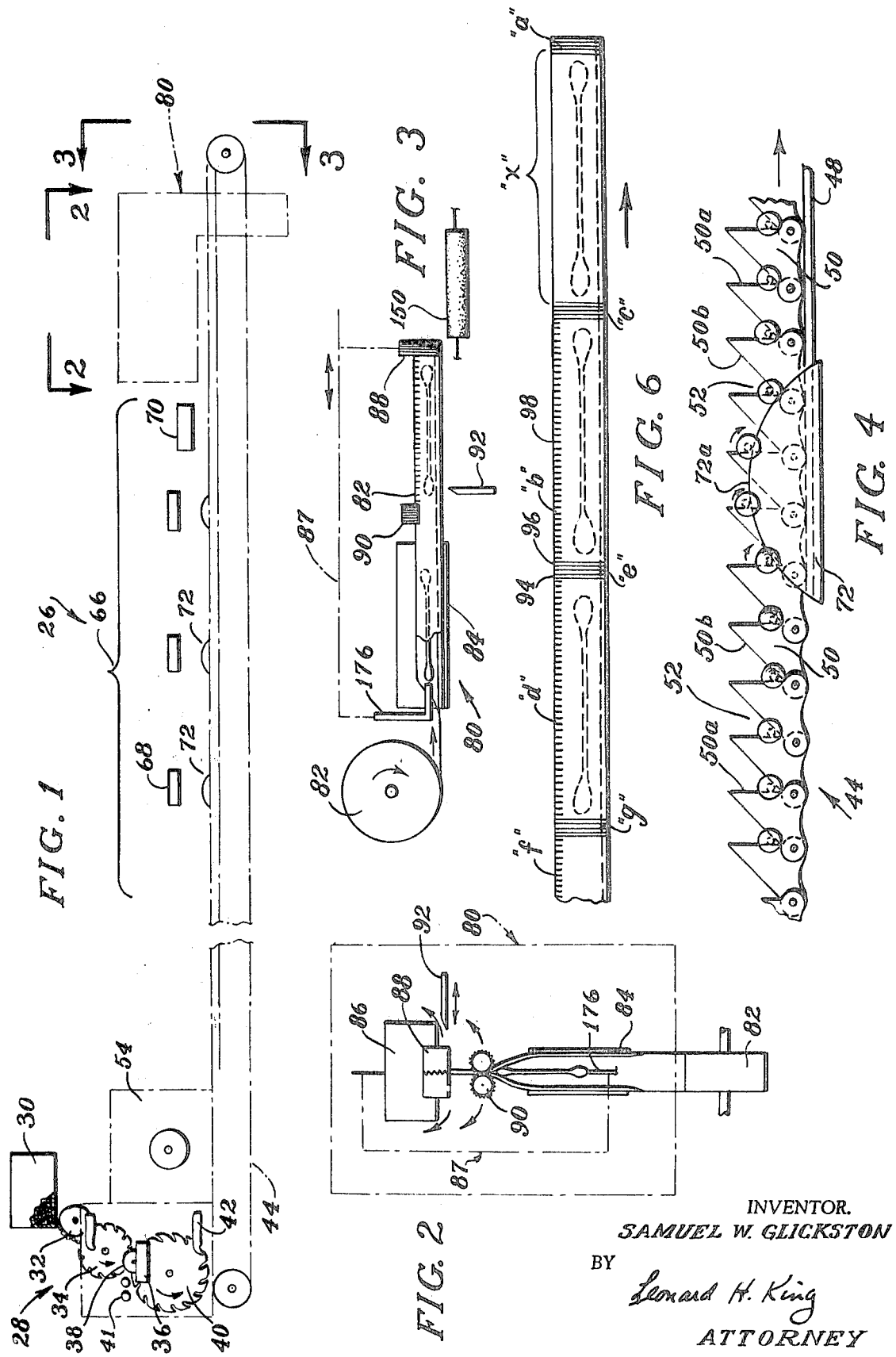
INVENTOR.
SAMUEL W. GLICKSTON
BY
Leonard H. King
ATTORNEY SAMUEL W. GLICKSTON,
INVENTOR.
BY Leonard H. King
ATTORNEY INVENTOR.
SAMUEL W. GLICKSTON
BY Leonard H. King
ATTORNEY 3,611,674
APPARATUS AND METHOD FOR FORMING AND
PACKAGING COTTON SWABS
Samuel W. Glickston, 111 S. Marion Place,
Rockville Centre, N.Y. 11570
Filed Jan. 21, 1969, Ser. No. 792,460
Int. Cl. B65b 9/06, 51/30, 61/24
U.S. Cl. 53—182
1 Claim

ABSTRACT OF THE DISCLOSURE

A metered quantity of dry cotton is applied to sticks and, using a binder material, is subsequently shaped into swabs by rollers. A conveyor transports the shaped swabs through a binder curing zone to apparatus for individually packaging the swabs.

This invention relates generally to cotton swabs and more particularly to improved apparatus as well as a novel method for continuously forming, conveying and packaging swabs at a high rate of speed.

BACKGROUND OF THE INVENTION

Because of the intense competition in the swab making industry, it is essential that the apparatus and method used for fabricating and packaging the swabs be the best available and that they operate at their most efficient and productive capacities. Since both labor and materials costs are substantially the same for all producers of a given volume, it follows then that a competitive advantage can best be obtained through the use of more efficient machinery and methods that reduce the reject rate and which minimize "down" time for repairs and maintenance. The present invention meets the above objectives as well as the high standards of the industry.

Whereas prior art apparatus required that the cotton be applied to the sticks in a wet condition in order to be formed and to achieve adherence of the cotton to the stick, the present invention is distinguished by the application of dry cotton to an adhesively coated stick. Subsequently, and only immediately prior to forming the cotton to the desired shape by means of a shaped roller at a forming station, a binder is added. Heretofore the use of cotton impregnated with a liquid binder at the initial assembly stage has resulted in a high reject rate and a considerable loss of production time. The apparatus was very susceptible to contamination by the binder material. However, the present invention overcomes the long standing problem of the binder material fouling the cotton assembling apparatus and the associated conveyor.

Another important feature of this invention is the novel conveyor system that extends from the cotton to stick assembling station mentioned above to a packaging station that will be described later on. An endless chain, driven by a motor and sprocket arrangement, is supported by bars so that both the chain and the conveyor run straight and true. The conveyor is defined by a plurality of substantially triangular plates that are secured to the two opposed, longitudinal sides of the chain whereby a portion of each two adjacent plates forms a wedge type seat for an end portion of the stick. The shape of the seat assures that the sticks will remain aligned in parallel planes as the conveyor moves with the chain. If the binder is of the type that is cured by the application of heat, then the conveyor is moved through a heated curing zone. To assure that the binder is uniformly cured, means are provided to periodically turn each stick several times about its own longitudinal axis so that the entire cotton surface of the formed swab is presented to the heating means.

It has also been found that there is a demand for individually packaged swabs that will remain in a relatively sterile condition. A number of individually packaged swabs may subsequently be bulk packaged if desired. However, it is essential that the individually packaged swabs be priced competitively with prior art bulk packaged swabs. Otherwise the cost factor would limit their acceptability in spite of their greater utility. Accordingly, the present invention provides novel packaging means adjacent a portion of the conveyor that is remote from the forming station. The packaging station includes means to feed a strip of packaging material in a trough-like shape and means to deposit individual swabs in the material trough. The packaging material is then closed about the swab, such as by heat sealing the application of an adhesive or other comparable means and the packaged swab is then severed from the remainder of the material. If desired, a second conveyor may be used to move the wrapped swabs from the packaging station to bulk packaging means.

The structure described very briefly above provides for high speed production of swabs having highly consistent cotton density and shape. The apparatus requires a minimum of attention. Labor is needed only to insert raw materials and to remove the finished product. The swabs are individually packaged automatically without the introduction of additional handling. Because of the concept of assembling dry cotton to the sticks and subsequently using a binder and forming rollers, the swab content and shape is very uniform. Because of the improved conveyor system, having means to rotate the sticks, all of the binder is completely cured.

Accordingly, it is an important object of this invention to provide improved apparatus for manufacturing and packaging cotton swabs.

It is another important object of this invention to provide an improved method for manufacturing and packaging cotton swabs.

A further object of this invention is to provide improved swab forming means.

A particular object of this invention is to provide improved swab forming means wherein the cotton is applied to the stick in the dry condition and has a binder added thereto just prior to its being formed by means of a shaped roller.

An additional object of this invention is to provide an improved conveyor for transporting the swabs away from the forming station.

Still another object of this invention is to provide an improved conveyor having means for locating and releasably retaining the ends of the swabs.

Another object of this invention is to provide means for rotating the swabs about their own longitudinal axis as they are transported by the conveyor means through a curing zone.

A further object of this invention is to provide means for individually packaging formed swabs.

A particular object of this invention is to provide means for individually packaging formed swabs in a sealed container.

Yet another object of this invention is to provide heat sealing means for packaging individual swabs.

These and other features, advantages and objects of the invention will, in part, be pointed out with particularity and will, in part, become more obvious from the following more detailed description of the invention, taken in conjunction with the accompanying drawings which form an integral part thereof.

DESCRIPTION OF THE DRAWING

In the various views, like reference characters designate like parts.

FIG. 1 is a schematic side elevational view of the entire apparatus comprising the present invention;

FIG. 2 is a schematic plan view taken along line 2—2 of FIG. 1;

FIG. 3 is a schematic end elevational view taken along line 3—3 of FIG. 1;

FIG. 4 is a schematic side elevational view, on an enlarged scale, illustrating a portion of the conveyor;

FIG. 6 is a schematic elevational view of finished packages formed in accordance with the teachings of this invention;

FIG. 9A is a sectional detail view taken along line 9A—9A of FIG. 9;

Figure 5:
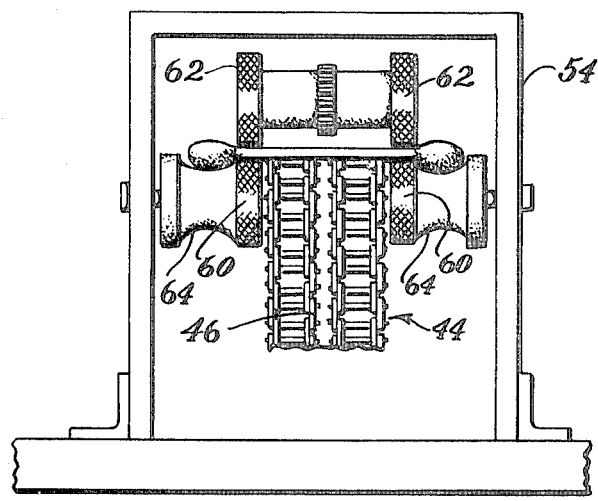
FIG. 5 is an enlarged transverse elevational view illustrating the swab forming portion of this invention.

Turning now to the drawings, and in particular to FIGS. 1–3, there is schematically shown a complete installation 26 for fabricating and individually packaging cotton swabs. The installation 26 includes a swab assembly station 28 which may be the equivalent of the structure shown in my issued U.S. Pat. No. 2,228,599. However, other swab assembly machines may be used with the understanding that the binder material is not applied at this station. The term "binder" is used generically herein and includes, but is not limited to, adhesively acting materials such as water, methyl cellulose and gum, latex, gum-arabic and the plastisols. For convenience a double ended swab will be described and illustrated but the structure may be readily modified to form a single-ended swab and still be within the scope or concept of this invention.

The swab assembly station 28, as shown schematically in FIG. 1, includes a supply bin 30 for the swab sticks, the supply bin having an opening near the bottom thereof. The swab sticks are dispensed through the opening and are delivered to a transfer roller 32 that deposits them, one at a time, in the surface notches of a first wheel 34. A glue box 36 and a roller 38 that is partially immersed in the liquid glue are used in a well known manner to adhesively coat both ends of each stick as the sticks are carried past by the first wheel 34. At an appropriate time the adhesively coated sticks are deposited on the notched surface of a second wheel 40 and are thereby transported through a station 41 that applies a metered quantity of cotton to the ends of the sticks in any well-known manner. A pivotally mounted deflector member 42 acts to disengage the sticks from the second wheel 40 and assists in depositing the sticks on a conveyor means 44 that will now be described.

In the embodiment of the invention that is illustrated fragmentarily on an enlarged scale in FIGS. 4 and 5, it will be seen that the conveyor 44 is comprised of an endless link chain 46 driven, in timed relationship with the second wheel 40 and with the deflector member 42, by any suitable means such as sprockets and a motor (not shown). Support rails 48 are provided to assure that the chain 46 does not sag or move laterally while it is traveling. A plurality of plates 50 each having a substantially vertical leading edge 50a and an inclined trailing edge 50b are secured to the opposed sides of the chain 46 such that triangular or wedgelike spaces 52 between one leading edge 50a and the inclined trailing edge 50b of two adjacent plates 50, define seats for the two opposed end portions of the sticks that have the cotton thereon.

The means for forming the cotton to the desired shape is shown in FIG. 5. A housing 54 straddles the conveyor 44 and is provided with suitable means to apply a binder material to the cotton. A first pair of longitudinally spaced coaxial knurled rollers 60 are rotatably mounted in the housing, the periphery of the rollers 60 being substantially tangent with the path of the sticks as they are moved by the conveyor 44. A second pair of longitudinally spaced, coaxial, knurled rollers 62 are mounted in the housing 54 directly above and in a cooperative, but spaced relation to the first pair of rollers 60. The two pairs of rollers 60 and 62 are arranged such that when the sticks enter the nip therebetween, they are angularly driven by the line or movement of the swab sticks moving with the conveyor 44. Each of the lower, knurled rollers 60 includes an integral, coaxial forming portion defined by a concave surface 64 arranged to engage and form the cotton on each stick as the sticks are moved past. It should be noted that the roller pairs 60 and 62 need not necessarily be positively driven. Instead they are angularly acutated by the linear movement of the sticks. Thus the two pairs of rollers 60 and 62 are driven by and at the same speed as the sticks so that the forming portions 64 can then shape the cotton without causing the binder material to splatter and contaminate the remainder of the swabs or any portion of the machine, particularly the conveyor 44. Once the swabs are formed, the binder is cured while the swabs are moving together with the conveyor 44. Apparatus suitable for this purpose will now be described.

A zone 66 (FIG. 1) is located adjacent the central portion of the conveyor 44, the zone including means to cure the binder after the cotton is formed as described above. For example, a plurality of heaters 68 are illustrated. The type, quantity and location of the curing means 68, as well as the length of the curing zone 66, is, of course, compatible with the particular binder material that is used. Although not illustrated in detail, the curing zone 66 may also include means 70 to sterilize the formed swabs. Alternatively, this step may be performed at a later stage. Finally, in the embodiment illustrated, the curing zone 66 is provided with several fixed cam means 72 to rotate the formed swabs about their longitudinal axis as they pass by the heaters or curing means 68. This cam structure and function will now be discussed, using FIG. 4 to illustrate their relationship with conveyor 44 and curing means 68.

If the swabs remain in one position as they travel through the zone 66, it is possible that the binder material will not be completely cured. Accordingly, the plurality of fixed cam means 72, each having an arched or convex top surface 72a, are positioned near the two longitudinal sides of the conveyor 44 and in the path of the opposite end portion of the swab sticks. As the swabs move with the conveyor 44 they are slightly lifted out of spaces or seats 52 when the swab stick portions first contact and ride over cam surfaces 72a. As mentioned above, the leading edges 50a of the plates 50 are substantially vertical while the trailing edges 50b of the plates 50 are positioned at an angle of approximately 45°. Thus the leading edges 50a actually push the free floating swabs which then rotate about their longitudinal axes due to their frictional engagement with the cam surfaces 72a. While the acute angle formed between edges 50a and 50b of adjacent plates 50 act to securely hold the sticks before and after their engagement with the cams 72, the sticks are easily lifted by the cam surfaces 72a so that they are free to rotate when in the vicinity of the curing means or heaters 68. It should be noted that the cams 72 do not lift the swab sticks sufficiently to completely remove them from the space 52. However, the swab sticks are lifted enough to clear the acute angle and to permit them to be freely rotated several times, the number of rotations being determined by the length of the cam 72. When the swab sticks leave the cam surfaces 72a they again fall into and are releasably gripped by the wedgelike spaces 52. Once the binder material is completely cured the formed swabs are transported by the conveyor 44 to a packaging station 80 that will be described broadly in connection with the schematic showing in FIGS. 2 and 3 and then in somewhat greater detail in connection with FIGS. 9–12.

Packaging station 80, as shown schematically in FIGS. 2 and 3, is located proximate the extremity of the conveyor 44 that is opposite the swab assembly station 28. The packaging station 80 includes a supply roll 82 of polyethylene, cellophane or the like. A U-shaped trough 84 is positioned beneath the lower run of the conveyor 44 to receive and appropriately shape the packaging material as it is drawn below and across the path of the lower run 44a of the conveyor 44 by structure to be described subsequently. The swabs drop off the conveyor 44 onto the formed packaging material in timed relationship to the reciprocation of a carriage 86. To assure that the swabs move together with the packaging material, a pusher assembly 87 engages the left hand end of the swab (FIG. 3) and travels with it at the same lineal speed as the packaging material. The pusher assembly 87 may be reciprocatingly actuated by the same drive means (not shown) as the carriage 86 which also includes a first pair of heated jaws 88 that pull the packaging material 82.

The first pair of jaws 88 includes heating means so that when they clamp and pull the packaging material 82 they also heat seal the trailing end of one package and at the same time heat seal the leading end of the following package. Suitably timed with the action of the first pair of heat sealing jaws 88 is a second pair of heated jaws 90 that seals the longitudinal edge while the first pair of jaws 88 pulls the packaging material 82. A knife 92 that is actuated by and timed with the movement of the carriage 86 and which is contained within the first pair of heated jaws 88 severs the packaging material 82 through the combined trailing and leading seal intermediate the ends of adjacent swabs. The finished packages are shown in FIG. 6 together with the heating means 88 and 90 that form leading, trailing, and longitudinal seals 94, 96 and 98, respectively. Optionally, a second conveyor may be positioned downstream of the packaging station 80 to remove the finished packages of swabs.

Figure 7:
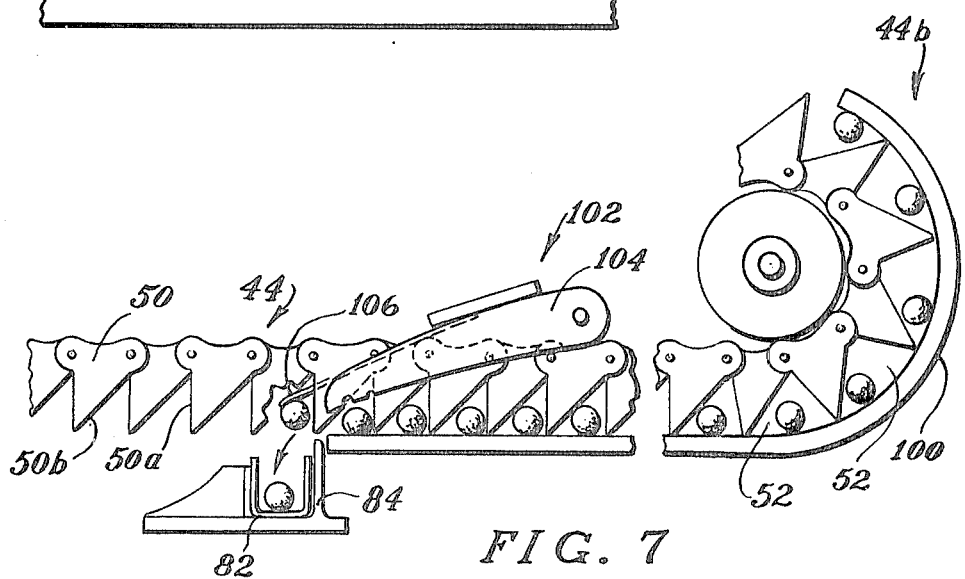
FIG. 7 is a side elevational view of the conveyor at the packaging station of the apparatus.
Figure 8:
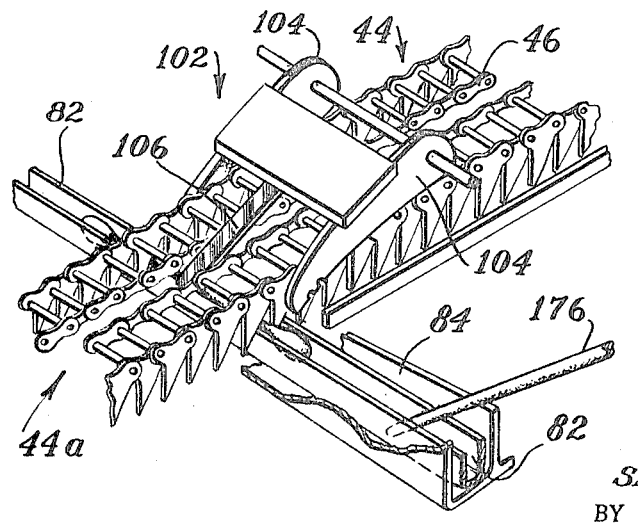
FIG. 8 is a perspective view of the swab ejector structure shown in FIG. 7.
Figure 9:
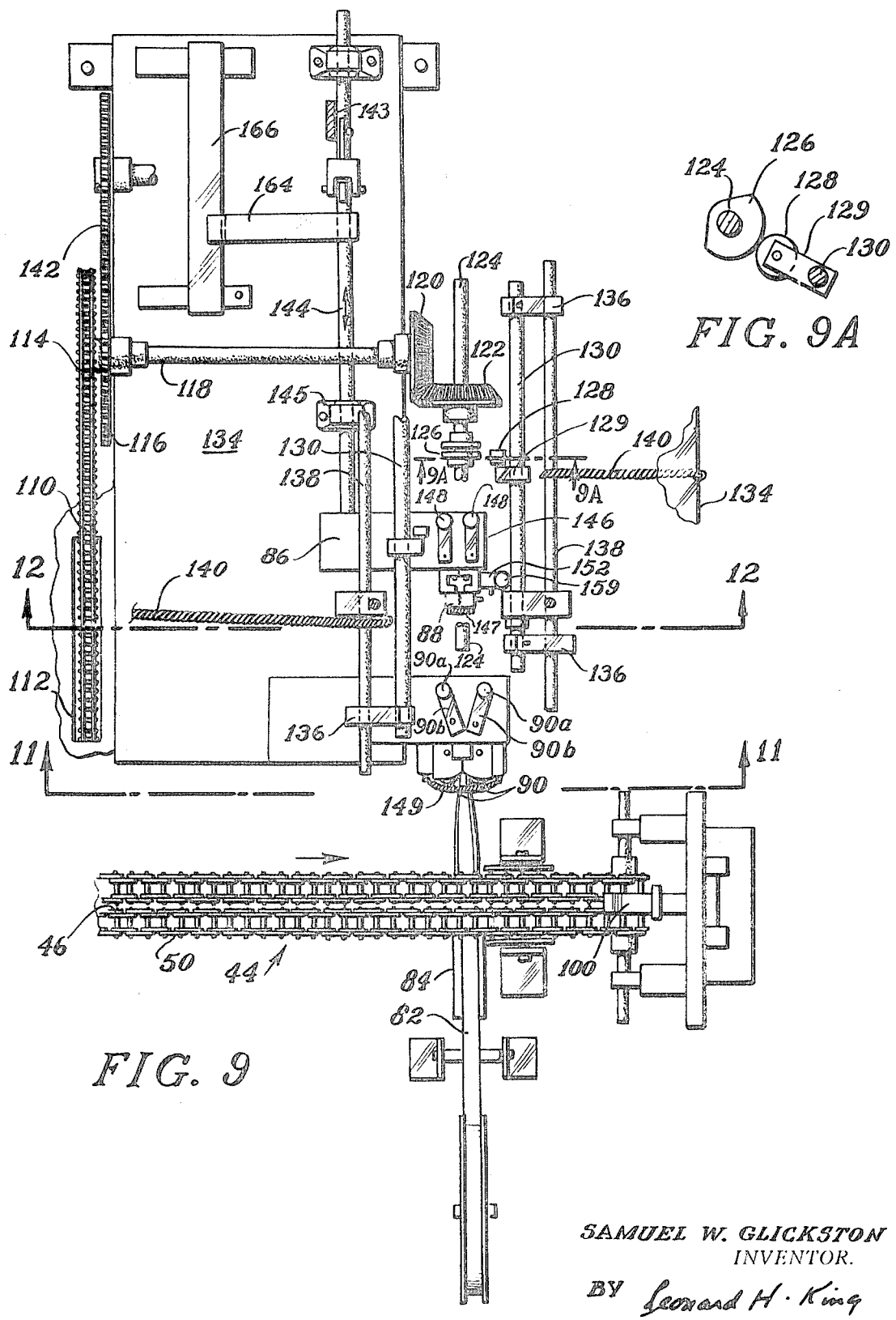
FIG. 9 is a plan view of the packaging station.
Figure 10:
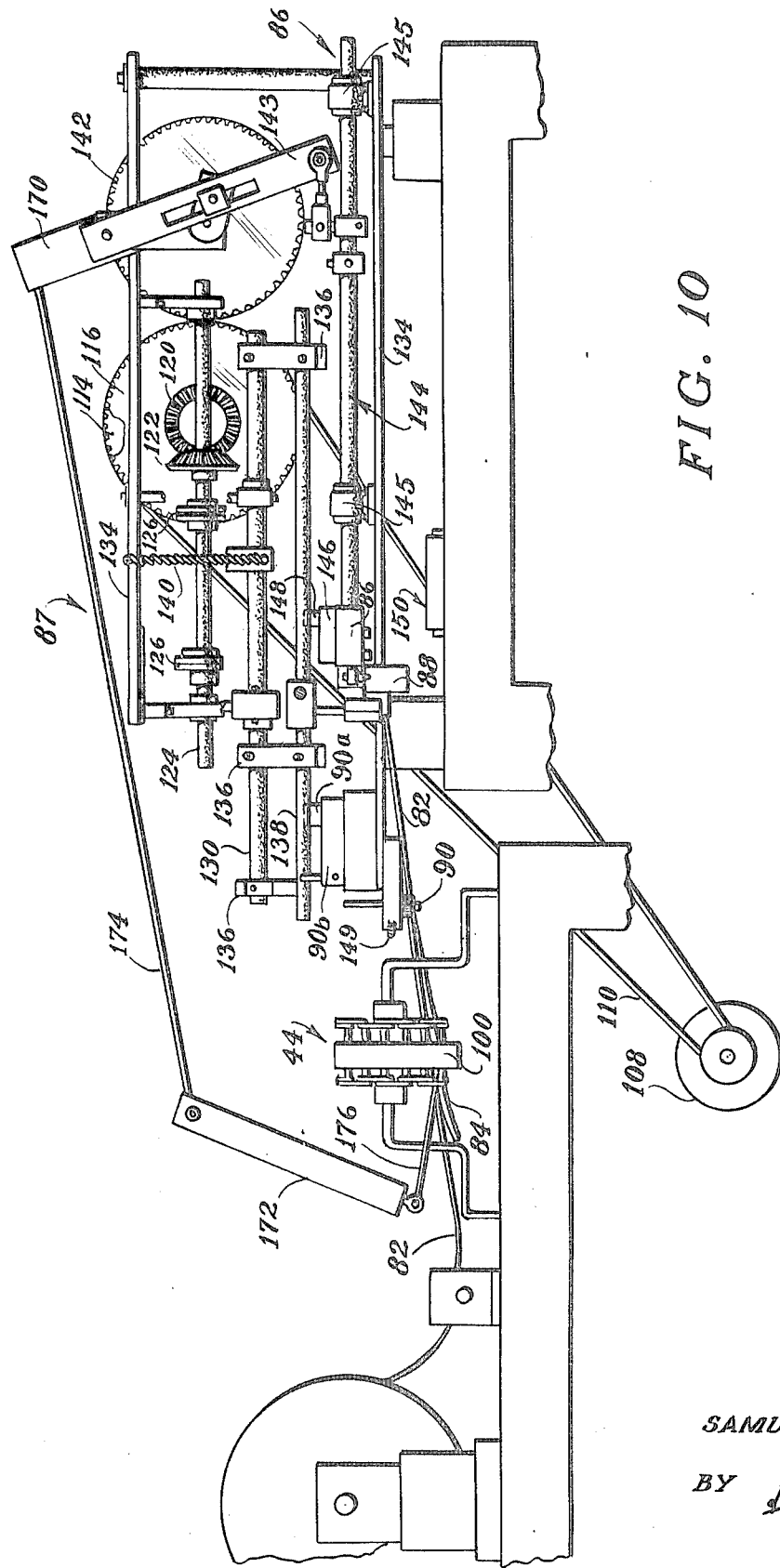
FIG. 10 is a side elevational view of the packaging station.
Figure 11:
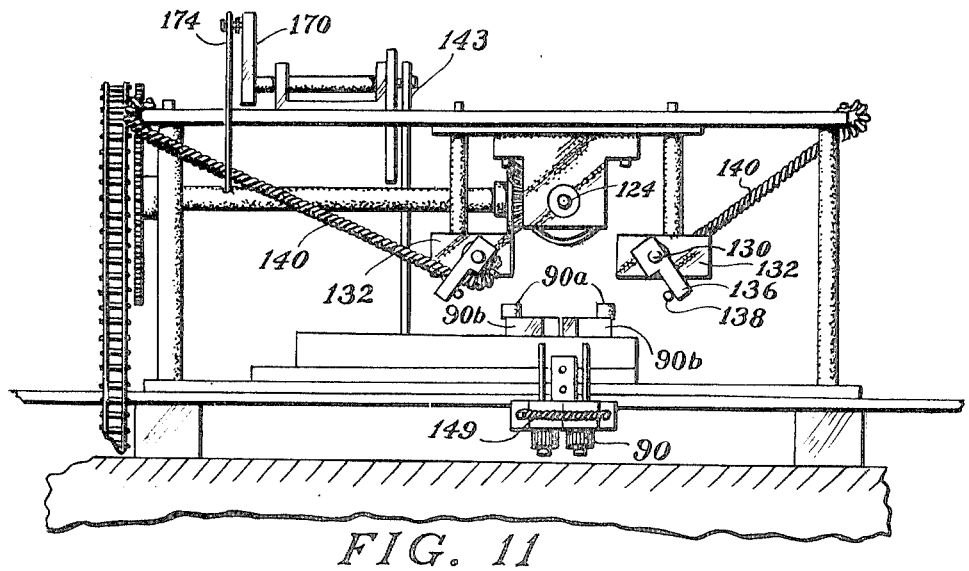
FIG. 11 is a sectional elevational view taken along line 11—11 of FIG. 9.
Figure 12:
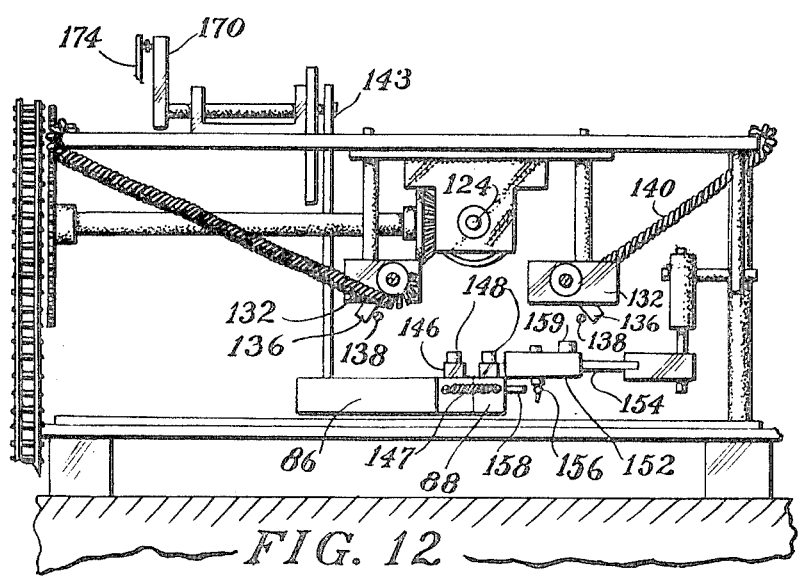
FIG. 12 is another sectional elevational view taken along line 12—12 of FIG. 9.

Before turning to a discussion of the apparatus for packaging individual swabs, it would be advantageous to describe that portion of the conveyor means 44 adjacent the packaging station 80. As may be seen in FIG. 7, the supply roll of packaging material 82, such as polyethylene, cellophane or the like, is positioned with its rotational axis parallel to the path of the conveyor 44 so that the packaging material 82 may be drawn at right angles to the direction of movement of the conveyor 44 and the swabs and therefore parallel to the longitudinal axis of each swab. The packaging material 82 is fed into the trough 84 that is fixedly positioned below the lower run 44a of the conveyor 44 and which extends at right angles thereto, to a position in close proximity with the second pair of heated jaws 90. The swabs are maintained in alignment on the conveyor 44 as they traverse the curved end and lower run portions 44b and 44a thereof by means of a curved guard rail 100 as shown in FIG. 7. The guard rail 100 is located in close proximity to the outwardly extending tips of the plates 50 that are secured to the conveyor chain 46 and which support the swabs. Thus, even though the swabs may drop from their seats 52 as they traverse the curved end and lower run portions 44b and 44a of the conveyor 44, they are still maintained in relative alignment by means of the guard rail 100. Adjacent to the trough 84 is an ejector mechanism 102 (FIGS. 7 and 8) comprising a pair of side plates 104 that straddle the conveyor chain 46 and a centrally located, resilient member 106 that interferes with the movement of the swabs if they fail to drop out of the seats 52. Thus, the resilient member 106 positively directs the swabs downwardly into the packaging material 82 within the trough 84 as the swabs pass the end of the guard rail 100. It will be appreciated that the foregoing structure maintains accurate alignment of the swabs up until the time they are ready for packaging.

Turning now to FIGS. 9–12, it will be seen that a drive motor 108, through a chain 110 and sprockets 112 and 114, drives a gear 116 that is mounted co-axially with sprocket 114 on a shaft 118. The shaft 118 also includes a first bevel gear 120 which, through a second bevel gear 122, drives a timing shaft 124. A pair of axially spaced cam members 126 are secured to the timing shaft 124 and are arranged to engage rollers 128 that are mounted by means of arms 129 on two longitudinally extending actuator shafts 130 (FIG. 9A). The two spaced actuator shafts 130 are positioned parallel to the timing shaft 124 and are journaled for pivotal movement in bearing blocks 132 (FIGS. 11 and 12) that are suitably secured to a fixed support frame 134 of the packaging station 80. Proximate the ends of each of the two actuator shafts 130 there are provided radially extending members 136 to which is rigidly secured an elongated bar 138. This construction permits each of the bars 138 to pivot about the longitudinal axis of the shaft 130 to which it is secured when the cam members 126 engage the roller 128 associated with each actuator shaft 130. Spring means 140, extending between each of the actuator shafts 130 and a fixed portion of the frame 134, return the actuator shafts 130 to their original position when the cam members 126 are not acting on rollers 128. In this connection it should be noted that the cam members 126 have an angularly adjustable surface so that the range of arcuate movement of the bars 138 may be established and varied in accordance with the requirements of the apparatus.

Before continuing with an explanation of how the swabs are packaged, it is necessary to refer once again to the drive system. It will be seen in FIGS. 9 and 10 that a second gear 142 is in meshing engagement with the gear 116 that is driven by the motor 108. The second gear 142, through an eccentric and adjustable crank arm 143, drives the carriage 86 by means of a reciprocating shaft 144 that is slideably mounted in bearing means 145 which are secured to the machine frame 134. Carriage 86 is therefore arranged for reciprocating movement in a direction perpendicular to the path of the conveyor 44 and therefore parallel to the path of the swabs as they are being packaged. The first pair of heated jaws 88 are mounted on the carriage 86 for reciprocating movement together therewith and are also rigidly mounted on pivot arms 146 journalled in the carriage 86, the pivot arms 146 having rollers 148 integral therewith. The rollers 148 and therefore the pivots arms 146 and the first pair of heated jaws 88 are responsive to the arcuate movement of the bars 138. Spring means 147 extend between the first pair of heated jaws 88 and serve to hold them in a normally closed position during those times when they are not being acted on by bars 138.

Figure 13:
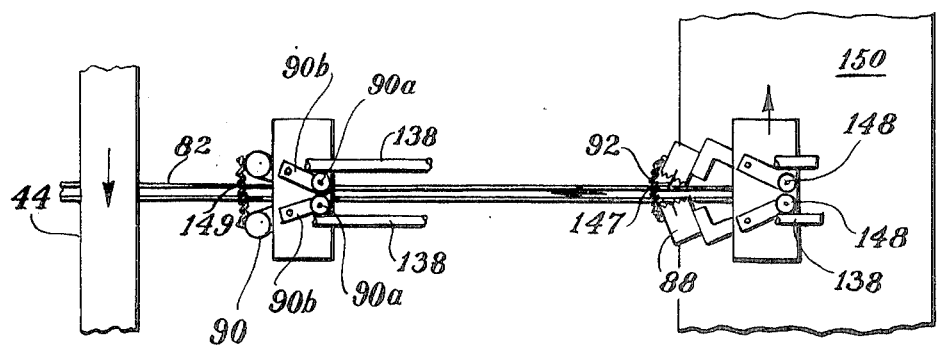
FIGS. 13–15 are semi-schematic plan views illustrating the relative positions of certain structure during the operating cycle.
Figure 14:
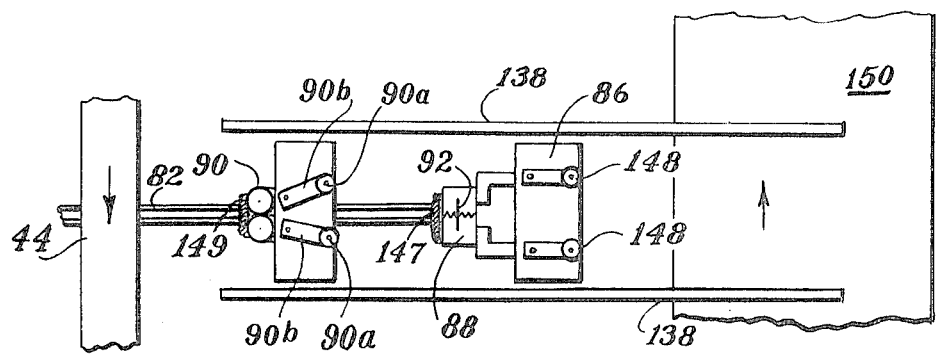
Figure 15:
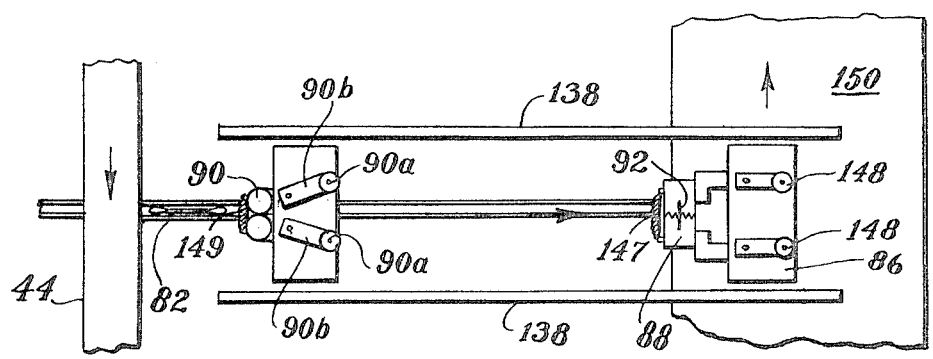

The sequence of operation may best be understood by reference to FIGS. 13–15. Assuming that the start of the cycle is at the time when the first heated jaws 88 are at the position furthest from the conveyor 44 (FIG. 13), then the first step is the movement of the first heated jaws 88 in a direction towards the conveyor 44. During this travel the first heated jaws 88 will be open as a result of the action of the rods 138 bearing against rollers 148. At the end of the forward stroke of the carriage 86 (FIG. 14), that is when the carriage 86 is closest to the conveyor 44, the first heated jaws 88 will be closed by spring means 147 and will form the combined trailing and leading edge crimps 96 and 94 and, as will be described more fully hereinafter, the leading package will be severed by knife 92 from the remainder of the packaging material 82 at approximately this time. The carriage 86 then starts its rearward stroke (FIG. 15), that is away from the conveyor 44, and the first heated jaws 88 remain closed to pull the packaging material.

Turning now to the second heated jaws 90 it will be seen that spring means 149 keep them closed during the return stroke of the carriage 86 (FIG. 15) so that the longitudinal seal 98 is formed. In order to prevent overheating of the packaging material 82, the second heated jaws 90 are maintained open at all other times (FIG. 13) by the action of the bars 138 against rollers 90a that are mounted on a pair of arms 90b rotatably journalled and coupled to the second pair of heated jaws 90. When the first heated jaws 88 reach the rearward end of the stroke of the carriage 86, they are opened in order to release the now finished package. A second conveyor 150 (FIGS. 3, 9 and 10) positioned proximate the end of the rearward stroke of the carriage 86 receives the individually packaged swabs and removes them from the machine, for example, to a bulk packaging stage (not shown).

By way of summary then, the first heated jaws 88 are held open during the entire forward stroke of the carriage 86 and they are closed by spring means 147 only at the end of the forward stroke of the carriage to form the combined trailing and leading edge crimp 96 and 94. The first heated jaws 88 remain closed through the entire return stroke in order to pull the packaging material and in order to permit the second heated jaws 90 to form the longitudinal edge crimp 98. At the end of the return stroke of the carriage 86, the first heated jaws 88 open in preparation for the next forward stroke of the carriage 86 and to drop the completed package. The second heated jaws 90 are closed by spring means 149 only for the length of the return stroke of the carriage 86 that is necessary to complete the longitudinal crimp. At all other times the second heated jaws 90 are held open. It should be noted that the bars 138 act to open both the first and second pairs of heated jaws 88 and 90, respectively.

The sequence of operation described directly above may be fully appreciated by reference to FIG. 6. Jaws 88 first grip and seal the packaging material at the position marked a and pull it so that the seal b is concurrently formed by jaws 90. A seal is actually formed at a but this is immaterial since no longitudinal seal is formed of length x and the first package must therefore be wasted. During the second rearward stroke of the carriage 86, jaws 88 grip the material at c, which has been moved to the position previously occupied by seal a. At the same time seal d is formed because this portion of the packaging material has also been moved proximate jaws 90 by the first stroke of the carriage 86. When jaws 88 grip the material at e and pull it, seal f is formed. Each time the jaws 88 grip the material (at a, c, e, g etc.) a combined trailing and leading seal 96 and 94 is formed. At each rearward stroke (except the first one) a longitudinal seal 98 is formed at b, d, f etc.

Figure 16:
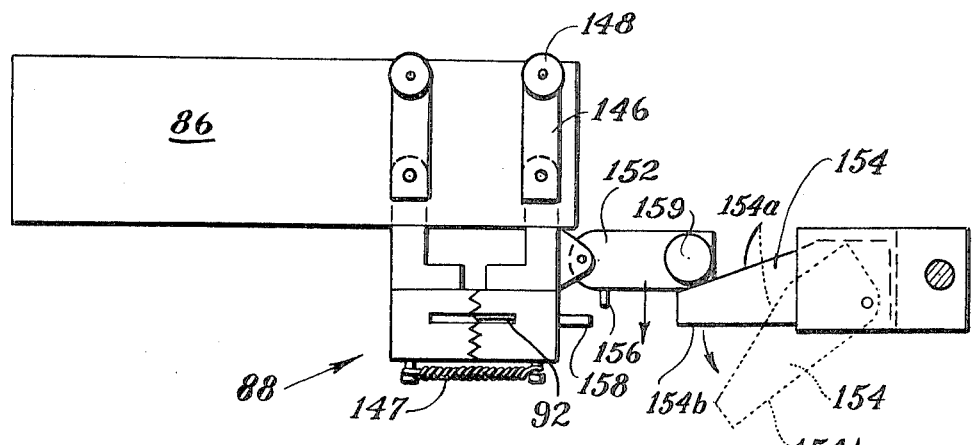
FIGS. 16 and 17 are plan views illustrating the positions of other structure during the operating cycle.
Figure 17:
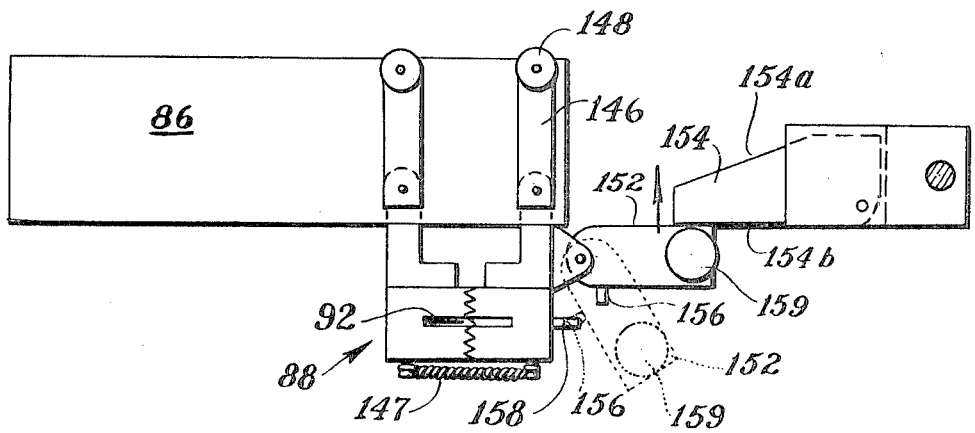

The means to sever a finished package from the remainder of the packaging material 82 will now be described. Referring to FIGS. 16 and 17 it will be seen that the carriage 86 is provided with a lug 152 proximate the first heated jaws 88. The lug 152 extends outwardly from the carriage 86 and in a direction transverse to the path thereof in order to engage an actuator 154 that is pivotally mounted with respect to the machine frame 134. The lug 152 is pivotally mounted on the carriage 86 and includes a pin 156 extending parallel to the path of the carriage 86. It will be further noted that one of the first heated jaws 88 includes a stud 158 extending outwardly therefrom in a direction perpendicular to the movement of the carriage 86. The knife 92 is spring biased within one of the first heated jaws 88 and is arranged to be received in a mating slot in the other of the first heated jaws 88. The knife 92 is arranged to be displaced from one to the other of the first heated jaws 88 and thereby cut through the packaging material 82.

With particular reference to FIG. 16 it will be seen that, near the end of the forward stroke of the carriage 86, roller member 159 on the lug 152 engages an inclined edge 154a of the actuator arm 154 and in so doing angularly displaces the actuator arm 154 in a counterclockwise direction from its original position. After the first heated jaws 88 make the combined trailing and leading edge crimp and the carriage 86 starts its return stroke (FIG. 17), the roller member 159 on the lug 182 will strike another edge 154b on the actuator arm 154. Since the actuator arm is prohibited from moving in a clockwise direction, then the lug 152 will rotate in a clockwise direction about its own pivot point. When this happens pin 156 will also be pivoted and will engage and displace the stud 158. As the stud 158 is moved inwardly of the first heated jaws 88 it will push the knife 92 across the packaging material and into the slot of the opposite one of the first heated jaws 88. Once the lug 152 passes the actuating arm 154 on the return stroke of the carriage 86 it will return to its original position as will the stud 158 and the knife 92. Conventional torsion springs (not shown) on the lug 152 and the actuator arm 154 may be used to provide the return motion of these respective elements. A compression spring (not shown) may be used to return the stud 158 to its original position after pin 156 is disengaged therefrom.

From the foregoing, it will be evident that only the very first package produced will not have a longitudinal crimp seal 94 of the next succeeding package. The first heated succeeding forward stroke of the carriage 86 the first heated jaws 88 will simultaneously form the leading crimp seal 94 of the next scucceeding package. The first heated jaws 88 maintain engagement with the packaging material 82 and pull it rearwardly or away from the conveyor 44 as the carriage 86 moves so that the second heated jaws 90 can, at that time, make the top-edge crimp seal 98. At the beginning of the rearward stroke of the carriages 86, the knife 92 is actuated to sever one complete package. At the end of the rearward stroke of the carriage 86 the first and second heated jaws 88 and 90, respectively, open to drop the complete package and to prevent unnecessary application of heat to the packaging material 82.

Several other features of the present invention should be mentioned. First, it will be seen in FIG. 9 that means in addition to the bearings 145 are used to guide the carriage 86. One end of an arm 164 is rigidly secured to the shaft 144 that reciprocates the carriage 86. The other end of the arm 164 is slotted and slidably engages a bar 166 that is rigidly secured to the machine from 134. Thus the carriage 86 is accurately guided along its reciprocating path.

Another aspect of the present invention relates to the stepwise movement of the packaging material 82 as well as the swabs deposited therein. While the first heated jaws 88 are more than adequate to pull the packaging material 82, it has been found desirable to concurrently push the swabs during the return stroke of the carriage 86. The pusher assembly 87 (FIG. 10) serves this purpose. Links 170 and 172, together with a rod 174 extending therebetween transmit the motion of the crank arm 143 to a rod 176. The throw of the rod is, of course, selected such that it pushes the swab for a sufficient distance while the first pair of jaws 88 grip and pull the packaging material. However, the pusher rod 176 in no way interferes with the action of the second pair of heated jaws 90 that forms the longitudinal seal 98.

From the foregoing it is evident that a substantially improved apparatus for forming, conveying and individually packaging swabs has been disclosed. The forming station assures that the binder material will be applied only to the cotton and will not contaminate any other portion of the apparatus. The conveyor, which in the embodiment illustrated is approximately 14 feet in length and which has a ½ inch pitch, transports the swabs smoothly through a curing zone that includes means to rotate the swabs so that the binder material is uniformly cured. Means to sterilize the swabs, if this is desired, can also be included. The packaging station of this invention can individually wrap 375 to 500 swabs per minute as compared with approximately 100 swabs per minute by the prior art devices.

In its broadest aspect the packaging station is comprised of means for receiving and positioning a length of packaging material about each swab, means for gripping the packaging material so that it may be moved, together with a swab, away from the conveyor, means for closing the packaging material about the swab and means to sever the packaged swab from the remainder of the packaging material. Advantageously, the gripping and at least one of the package closure means are combined in a first pair of jaws that are pivotally mounted and arranged for linear reciprocation while the means to form the remainder of the seal is embodied in a second pair of heated jaws that are pivotally mounted and arranged for rotary movement. While two pairs of heated jaws have been described as the means to seal each individual package, it should be understood that the invention is not limited to this construction. Conceivably, only a single pair of heat sealing jaws could be used. Other package closing means such as means to apply an adhesive is also within the scope of this invention.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. A machine for individually packaging swabs received from conveying means comprising:
   (a) means adjacent a portion of said conveying means for receiving and positioning a length of packaging material about each swab;
   (b) means for moving the length of packaging material away from said conveying means whereby the swab moves together with the packaging material, said means for moving the packaging material comprising gripping means, drive means for reciprocating said gripping means along a path substantially perpendicular to the path of said conveying means and means for opening and closing said gripping means in timed relationship with the reciprocating movement thereof whereby said gripping means are open when moving towards said conveying means and closed about the package when moving away from said conveying means, said drive means comprising a motor, a crank arm driven by said motor and a carriage supporting said gripping means, said carriage being coupled to said crank arm, said means for opening and closing said gripping means comprising cam means driven by said motor and actuator means responsive to said cam means said actuator means being arranged to engage and move said gripping means between the open and closed positions;
   (c) means for closing the packaging material about the swab to thereby form a package, said means for closing the package comprising first heating means integral with said gripping means for sealing at least a portion of the package when said gripping means are closed;
   (d) second heating means for sealing the remainder of the package, said second heating means comprising a second pair of jaws pivotally mounted and arranged to move into and out of engagement with the packaging material, said second heating means being responsive to said actuator means in timed relationship with the movement of said first heating means;
   (e) means for pushing the swabs in timed relationship with the moving of the packaging material, said pushing means being responsive to said crank arm;
   (f) means for severing the package from the remainder of the packaging material.

References Cited

UNITED STATES PATENTS

| | | | |
|---|---|---|---|
| 3,194,124 | 7/1965 | Warp | 93—35 |
| 3,256,674 | 6/1966 | Rutherford | 53—123 X |
| 3,312,036 | 4/1967 | Harp | 53—182 |
| 3,354,795 | 11/1967 | Kugler | 93—35 |
| 3,395,622 | 8/1968 | Kugler | 93—35 |
| 3,420,035 | 1/1969 | Deans | 53—182 |
| 3,427,781 | 2/1969 | Kral | 53—182 X |
| 3,443,356 | 5/1969 | Hani | 53—182 X |
| 3,500,610 | 3/1970 | Chenoweth | 53—209 X |
| 3,524,299 | 8/1970 | Mundt | 53—123 X |

WAYNE A. MORSE, JR., Primary Examiner

U.S. Cl. X.R.

53—33, 123, 209; 93—35 PC